United States Patent
Li et al.

(10) Patent No.: US 10,056,649 B2
(45) Date of Patent: Aug. 21, 2018

(54) NON-AQUEOUS ELECTROLYTIC SOLUTIONS AND ELECTROCHEMICAL CELLS COMPRISING THE SAME

(75) Inventors: Wentao Li, Solon, OH (US); Martin W. Payne, Avon, OH (US)

(73) Assignee: SHENZHEN CAPCHEM TECHNOLOGY CO., LTD., Shenzhen (CN)

( * ) Notice: Subject to any disclaimer, the term of this patent is extended or adjusted under 35 U.S.C. 154(b) by 291 days.

(21) Appl. No.: 14/110,640

(22) PCT Filed: Apr. 11, 2012

(86) PCT No.: PCT/US2012/032960
§ 371 (c)(1),
(2), (4) Date: Oct. 8, 2013

(87) PCT Pub. No.: WO2012/142060
PCT Pub. Date: Oct. 18, 2012

(65) Prior Publication Data
US 2014/0038059 A1  Feb. 6, 2014

Related U.S. Application Data

(60) Provisional application No. 61/473,958, filed on Apr. 11, 2011.

(51) Int. Cl.
*H01M 10/0567* (2010.01)
*H01M 10/058* (2010.01)
*H01M 10/052* (2010.01)
*H01M 10/0569* (2010.01)
*H01M 10/0525* (2010.01)

(52) U.S. Cl.
CPC ....... *H01M 10/058* (2013.01); *H01M 10/052* (2013.01); *H01M 10/0525* (2013.01); *H01M 10/0567* (2013.01); *H01M 10/0569* (2013.01); *Y10T 29/4911* (2015.01)

(58) Field of Classification Search
CPC .......... H01M 10/0567; H01M 10/058; H01M 10/0525
USPC ................................. 429/326, 330
See application file for complete search history.

(56) References Cited

U.S. PATENT DOCUMENTS

| | | | |
|---|---|---|---|
| 2006/0134527 A1* | 6/2006 | Amine | H01M 4/13 429/326 |
| 2007/0172740 A1 | 7/2007 | Otsuki et al. | |
| 2008/0153005 A1 | 6/2008 | Horikawa et al. | |
| 2010/0047695 A1 | 2/2010 | Smart et al. | |
| 2011/0123869 A1* | 5/2011 | Choi | H01M 10/0525 429/325 |
| 2011/0236765 A1 | 9/2011 | Matsui et al. | |
| 2012/0009485 A1* | 1/2012 | Xu | H01G 11/58 429/336 |
| 2012/0060360 A1* | 3/2012 | Liu | H01M 10/0525 29/623.2 |
| 2012/0164519 A1 | 6/2012 | Lee et al. | |

FOREIGN PATENT DOCUMENTS

| | | | | |
|---|---|---|---|---|
| CN | 101826635 A | * | 9/2010 | ........ H01M 10/0525 |
| JP | 2003249233 | | 5/2003 | |
| JP | 2007-080651 | | 3/2007 | |
| JP | 2007-200605 | | 8/2007 | |
| JP | 2009-158460 | | 7/2009 | |
| JP | 2010-15717 | | 1/2010 | |
| JP | 2011-054406 | | 3/2011 | |
| JP | 2012-134151 | | 7/2012 | |
| WO | 2011027530 | | 3/2011 | |

OTHER PUBLICATIONS

Kilawawa, et al. "Application of Fluorine-containing Solvents to LiCOO2 Cathode in high voltage operation". Electrochemistry 78(2010) No. 5, May 2010.
European Extended Search Report.
PCT International Search Report.
Wikipedia-Phosphate, Jan. 13, 2016, pp. 1-8.
Machine translation of JPA 2011-054406.
Machine translation of JPA2010-15717.
Machine Translation of JPA 2009-158460.
Machine Translation of JPA 2007-200605.
Machine Translation of JPA 2007-080651.

* cited by examiner

*Primary Examiner* — Stewart A Fraser
*Assistant Examiner* — Victoria Hom Lynch

(57) ABSTRACT

A non-aqueous electrolytic solution for use in a lithium secondary battery has reduced or eliminated flammability and increased capacity retention. The electrolytic solution includes a lithium salt, a carbonate, a substituted phosphazene, a fluorinated solvent such as fluorinated carbonate, fluorinated ether, and fluorinated ester, and an organic phosphate or organic phosphonate such as fluorinated alkyl phosphate, fluorinated aromatic phosphate, fluorinated alkyl phosphonate, or fluorinated aromatic phosphonate.

22 Claims, 3 Drawing Sheets

Figure 1: Rate discharge characteristics of the STD0, KJ0 and KJV electrolytic solutions in LCO/graphite cells at discharge of C/5 to 5C.
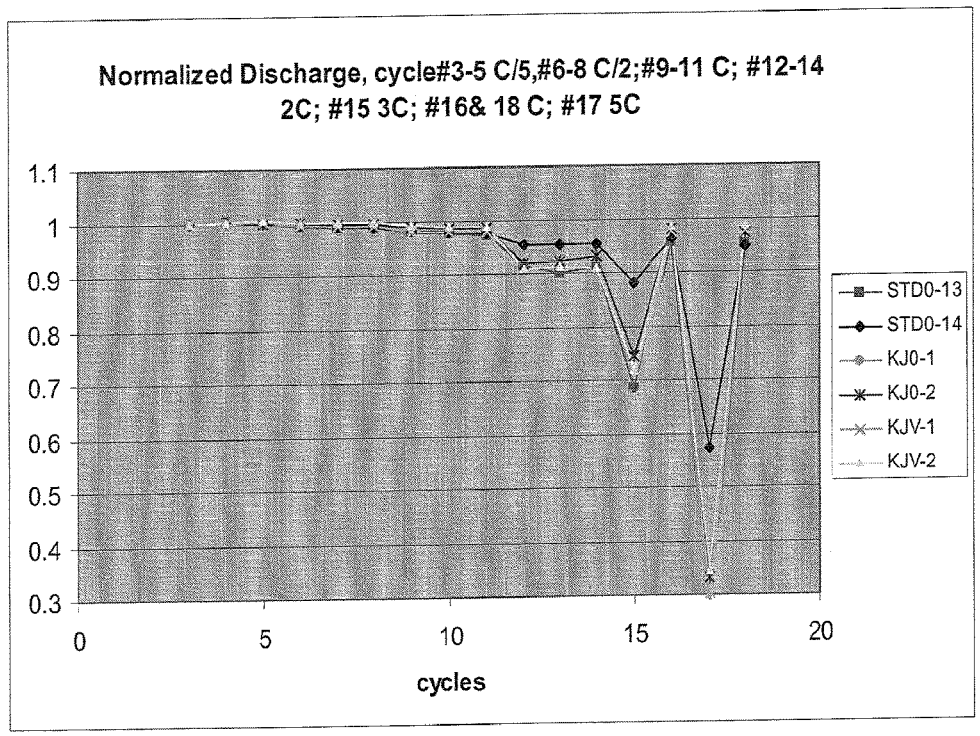
Figure 2: Room Temperature cycle life of the 700mah LCO cells with DMC and F-DMC electrolytic solutions.
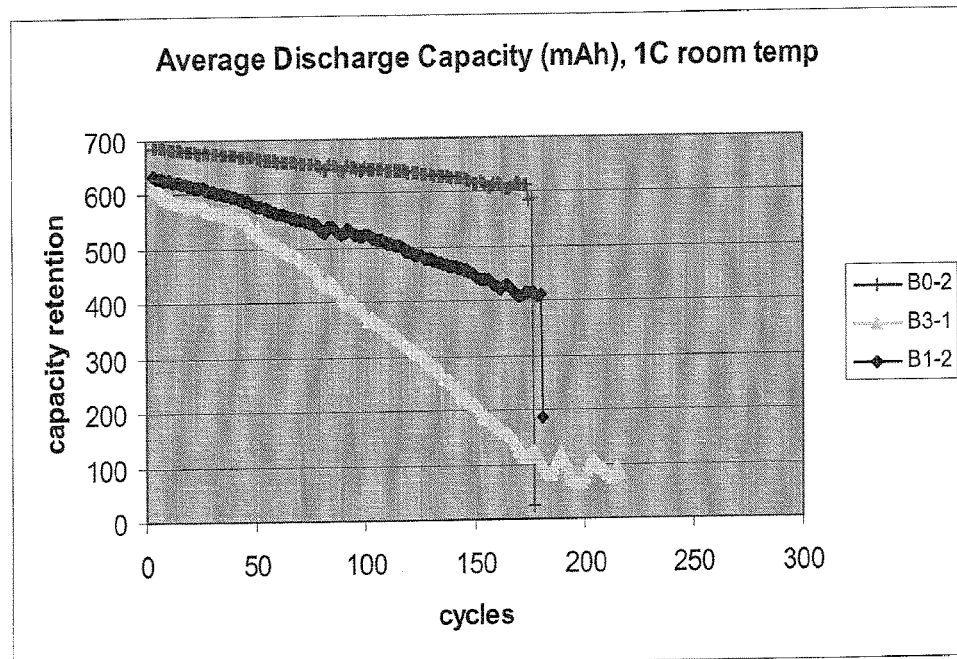

Figure 2A: Results of Figure 2 normalized.
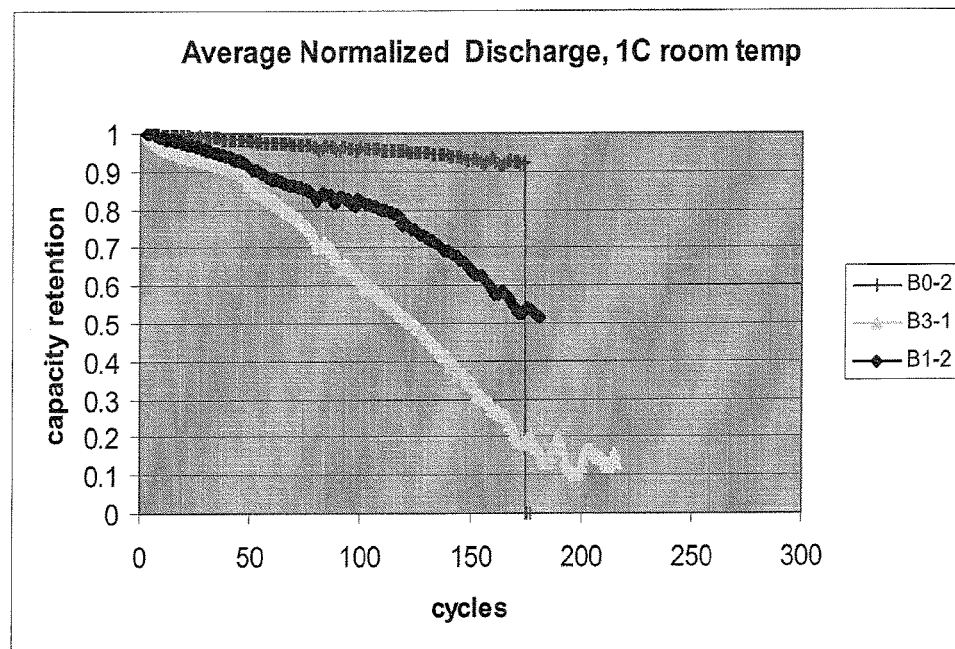
Figure 3: Capacity retention (room temperature cycle life) of LCO 700mAh Al can cells with STD, KJ0 and KJV, J4E0, J4EV electrolytic solutions.
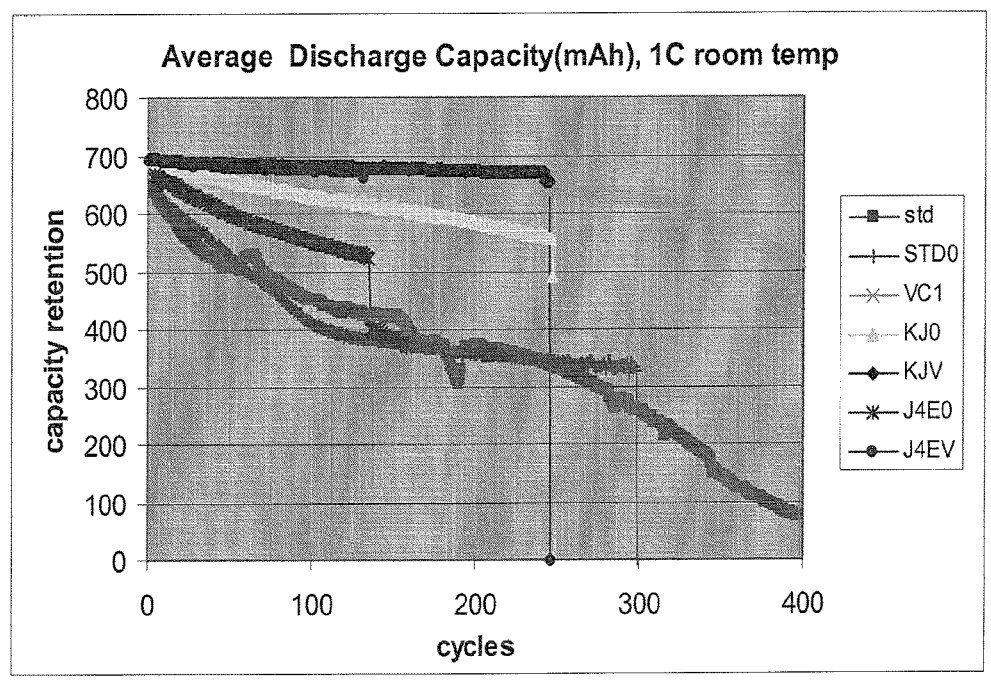

Figure 3A. Results of Figure 3 normalized.
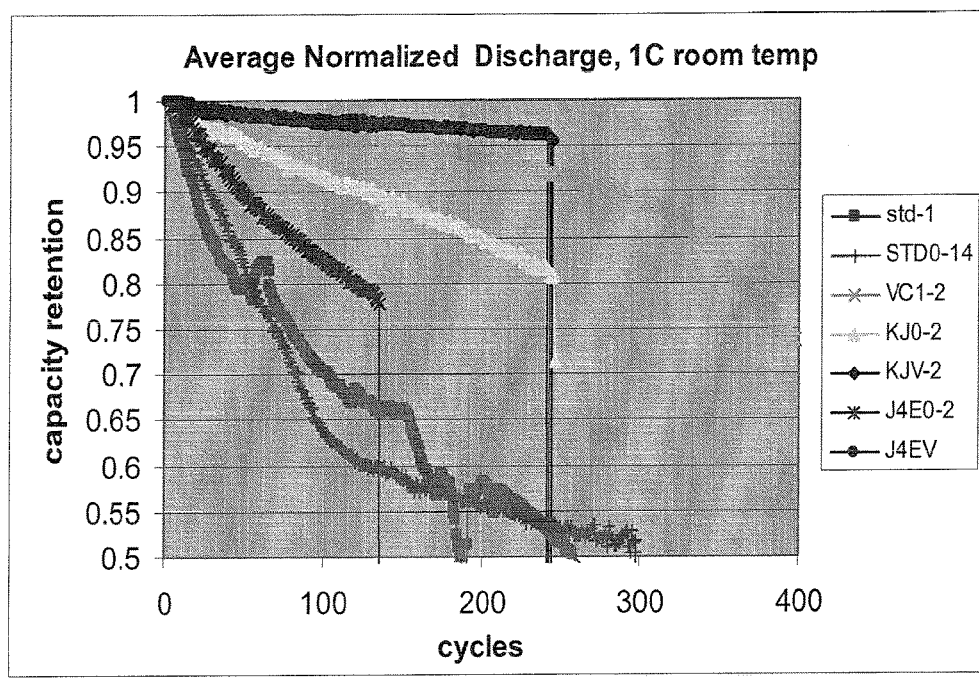

NON-AQUEOUS ELECTROLYTIC SOLUTIONS AND ELECTROCHEMICAL CELLS COMPRISING THE SAME

CROSS-REFERENCE TO RELATED APPLICATIONS

This application is the U.S. National Phase of PCT/US2012/032960 filed Apr. 11, 2012, which claims priority of U.S. Provisional Patent Application 61/473,958 filed Apr. 11, 2011.

BACKGROUND OF THE INVENTION

1. Field of Invention

The present invention relates to a non-aqueous electrolytic solution and an electrochemical energy storage device comprising the same. More particularly, this invention pertains to non-aqueous electrolytic solutions that comprise (a) one or more solvents; (b) one or more ionic salts; and (c) one or more additives. Non-aqueous electrolytic solutions capable of preventing fire or reducing flammability in energy storage electrochemical cells (e.g., lithium metal batteries, lithium ion batteries, lithium ion capacitors and supercapacitors) include a non-fluorinated carbonate, a lithium salt, a phosphazene compound, and a fluorinated solvent. Such electrolytic solutions enhance the battery performance, reduce capacity degradation during cycling and high temperature storage, and prevent or reduce flammability of a battery made therewith.

2. Description of Related Art

Safety is a primary concern for lithium ion batteries, especially large batteries with applications in xEVs (plug-in vehicles). The conventional electrolytic solutions currently used in lithium or lithium ion batteries are highly flammable, and there is justifiable concern that in an accident situation a potential exists for leakage from the batteries, which would thus burn in the presence of flame or spark. There is a need to improve the safety of the battery system by finding an electrolytic solution that is non-flammable, diminishing the chances that when the container is compromised in an accident the cells would easily catch fire.

Fluorinated phosphazene compounds have shown excellent flame retarding properties. However, for highly flammable solvents, such as EMC, in the electrolytic solution, a high concentration of additive(s) is required to achieve non-flammability. The high concentration required may cause a decrease in conductivity and can sometimes lead to deterioration in cell performance. Another concern with such compounds is the cost: they are about 10 times more expensive than other materials used in the electrolytic solution.

Fluorinated carbonates, fluorinated ethers, fluorinated esters, fluorinated alkanes, fluorinated alkyl phosphates, fluorinated alkyl phosphonate, and fluorinated aromatic phosphonate are other important nonflammable solvents. However, very high concentrations of these compounds (30% or higher) in the electrolytic solution is typically required to achieve the non-flammability desired. This high concentration of materials may cause problems such as poor salt solubility, phase separation of the electrolytic solution itself, and the potential for loss of cell performance.

Because of the high costs and possibility of poor cell performance associated with high concentrations of conventional flame retardants, it is imperative to find alternative formulations and materials that may improve upon either or both of these problems.

SUMMARY OF THE INVENTION

The present invention arises due to the discovery by the inventors herein that together with solvents typically used in lithium or lithium ion batteries, the use of phosphazene compounds together with at least one of a fluorinated carbonate, a fluorinated ether, a fluorinated ester, a fluorinated alkane, a fluorinated phosphate and a fluorinated phosphonate, in the electrolytic solution of a lithium or lithium ion battery produces synergistic effects in terms of imparting non-flammability to the electrolytic solution, as well as reducing the concentration of both materials required for non-flammability, while maintaining or improving the performance of the cell. In particular, the present invention provides a secondary battery comprising an anode, a cathode, and an electrolytic solution.

The electrolytic solution includes a lithium salt and at least one carbonate with the addition of a fluorinated phosphazene coupled with at least one fluorinated aliphatic/aromatic compound and/or one fluorinated phosphate/phosphonate. The shorthand of the style "aliphatic/aromatic" or "phosphate/phosphonate" means that either or both can be present, that is an aliphatic compound and/or an aromatic compound can be present in one alternative, while a phosphate and/or phosphonate can be present in the other. The fluorinated aliphatic/aromatic compounds are selected from the group consisting of: fluorinated carbonates, fluorinated ethers, fluorinated esters, and fluorinated alkanes. The fluorinated phosphate/phosphonate compounds are selected from the group consisting of: fluorinated alkyl phosphates, fluorinated aromatic phosphates, fluorinated alkyl phosphonates, fluorinated aromatic phosphonates, and combinations thereof. The electrolytic solution may further contain other performance enhancing additives. The electrolytic solution of the invention is non-flammable, has low cost, and the electrochemical device containing the non-aqueous electrolytic solution has improved safety and cycle life.

Plainly stated, by the use of (1) a fluorinated phosphazene additive, together with an additive (2) which could be (2a) at least one fluorinated aliphatic/aromatic compound and/or (2b) at least one fluorinated alkyl/aromatic phosphate/phosphonate additive, allows the use of less total additives than would be possible when using either (1) or (2) alone, to achieve the same or similar reduction or elimination in flammability.

The present invention provides a non-aqueous electrolytic solution having no or low flammability, a long cycle life, and high capacity retention for lithium metal and lithium ion batteries using the same. In particular, the present invention provides a non-aqueous electrolytic solution having a cyclic and/or linear carbonate that is not fluorinated, a fluorinated phosphazene coupled with at least one fluorinated aliphatic or fluorinated aromatic compound (such as a fluorinated ether) and/or one fluorinated phosphate or fluorinated phosphonate compound, such as a fluorinated alkyl phosphate. The non-aqueous electrolytic solution includes a lithium salt dissolved therein.

More precisely, the invention relates to an electrolytic solution comprising a lithium salt and a solvent, wherein the solvent comprises (i) at least one of a cyclic carbonate and a linear carbonate, (ii) at least one phosphazene compound represented by the structure $(PNX^1X^2X^3X^4X^5)_n$, where $X^1$-$X^5$ are substituents that are independently selected from the group consisting of nothing, halogen, oxygen, sulfur, alkyl, alkoxyl, phenyl, phenoxyl, or siloxyl, with the proviso that at least one substituent X is present, and is or contains fluorine, and n is 1-4, (iii)(a) at least one fluorinated solvent selected from the group consisting of fluorinated carbonate, fluorinated ether, fluorinated ester, fluorinated alkanes, and/or (iii)(b) at least one compound selected from the group consisting of fluorinated alkyl phosphate, fluorinated aromatic phosphate, fluorinated alkyl phosphonate, and fluorinated aromatic phosphonate.

Another embodiment of the invention is an electrolytic solution comprising a lithium salt and a solvent, wherein the solvent comprises (i) at least one of a cyclic carbonate and a linear carbonate, (ii) at least one phosphazene compound represented by the structure $(PNX^1X^2X^3X^4X^5)_n$, where $X^1$-$X^5$ are substituents that are independently selected from the group consisting of nothing, halogen, oxygen, sulfur, alkyl, alkoxyl, alkoxy-alkoxyl, phenyl, phenoxyl, or siloxyl, with the proviso that at least one substituent X is present, and is/or contains fluorine, and n is 1-4, (iii) at least one fluorinated solvent, wherein (iv) when n in the phosphazene formula is 3, and $X^1$-$X^5$ do not include alkoxy-alkoxyl, the at least one fluorinated solvent is selected from the group consisting of: fluorinated alkyl phosphate, fluorinated aromatic phosphate, fluorinated alkyl phosphonate, fluorinated aromatic phosphonate, fluorinated ester and fluorinated alkane; and (v) either (i) when n in the phosphazene formula is 1, 2, or 4, or (ii) when n in the phosphazene formula is 3 and $X^1$-$X^5$ includes at least one alkoxy-alkoxyl group, the at least one fluorinated solvent is selected from the group consisting of fluorinated carbonate, fluorinated ether, fluorinated alkyl phosphate, fluorinated aromatic phosphate, fluorinated alkyl phosphonate, fluorinated aromatic phosphonate, fluorinated ester and fluorinated alkane.

Another embodiment of the invention is an electrochemical device that includes a positive electrode, a negative electrode, and any electrolytic solution disclosed herein.

Yet another embodiment of the invention is a secondary battery comprising: (a) an anode, (b) a cathode, and (c) an electrolytic solution comprising (i) a lithium salt, (ii) a first, non fluorinated carbonate, (iii) a phosphazene, (iv) a fluorinated compound selected from the group consisting of organic phosphate or organic phosphonate compounds selected from the group consisting of fluorinated alkyl phosphate, fluorinated aromatic phosphate, fluorinated alkyl phosphonate, and fluorinated aromatic phosphonate, and fluorinated ester, fluorinated alkane, and/or fluorinated carbonate, fluorinated ether. Such electrolytic solutions help to prevent or reduce flammability in a lithium secondary battery. Beneficial side effects may include the formation of a solid-electrolyte interface (SEI) on the negative electrode surface of the batteries, improved stability of the electrolytic solution, and increased interaction between the electrolytic solution and electrodes. Batteries utilizing electrolytic solutions with such compositions have long life, high capacity retention, and less risk of flammability.

Another embodiment of the invention is a method of making a lithium battery or lithium ion battery comprising: (a) providing an electrolytic solution comprising a non-aqueous electrolytic solution comprising (1) a lithium salt (2) a non-fluorinated carbonate, (3) a phosphazene compound, (4) a fluorinated compound, (5) an organic phosphate or organic phosphonate (b) stacking atop one another (1) a first porous separator, (2) a cathode, (3) a second porous separator, and (4) an anode, (c) wrapping the electrodes and separators of (b) tightly together using adhesive to form an assembly, (d) inserting the assembly into an open-ended prismatic aluminum can or pouch, (e) attaching respective current leads to respective anode and cathode, (f) adding the electrolytic solution of (a) to the can or pouch, and (g) sealing the can or pouch.

These and other features and advantages of the present invention will become more readily apparent to those skilled in the art upon consideration of the following detailed description that depicts both the preferred and alternative embodiments of the present invention.

BRIEF DESCRIPTION OF THE DRAWINGS

FIG. 1 shows rate discharge characteristics of the STDO, KJO and KJV electrolytic solutions in LCO/graphite cells at discharge of C/5 to 5C.

FIG. 2 shows room temperature cycle life of the 700 mah LCO with DMC and F-DMC electrolytic solutions.

FIG. 2A shows results of FIG. 2 normalized.

FIG. 3 shows capacity retention (room temperature cycle life) of LCO 700mAh Al can cells with STD, KJO and KJV, J4E0, J4EV electrolytic solutions.

FIG. 3A shows results of FIG. 3 normalized.

DETAILED DESCRIPTION OF THE INVENTION

The following embodiments describe the preferred mode presently contemplated for carrying out the invention and are not intended to describe all possible modifications and variations consistent with the spirit and purpose of the invention. Features and advantages of the present invention will become more readily apparent to those skilled in the art upon consideration of the following detailed description.

More precisely, the invention relates to an electrolytic solution comprising a lithium salt and a solvent, (a) wherein the solvent comprises (i) at least one of a cyclic carbonate and a linear carbonate, (ii) at least one phosphazene compound represented by the structure $(PNX^1X^2X^3X^4X^5)_n$, where $X^1$-$X^5$ are substituents that are independently selected from the group consisting of nothing, halogen, oxygen, sulfur, alkyl, alkoxyl, phenyl, phenoxyl, or siloxyl, with the proviso that at least one substituent X is present, and is/or contains fluorine, and n is 1-4, (iii) at least one fluorinated solvent and (iii)(a) when n in the phosphazene formula is 3, and $X^1$-$X^5$ do not include alkoxy-alkoxyl, the at least one fluorinated solvent is selected from the group consisting of: fluorinated alkyl phosphate, fluorinated aromatic phosphate, fluorinated alkyl phosphonate, fluorinated aromatic phosphonate, fluorinated ester and fluorinated alkane; and (iii)(b) either (i) when n in the phosphazene formula is 1, 2, or 4, or (ii) when n in the phosphazene formula is 3 and $X^1$-$X^5$ includes at least one alkoxy-alkoxyl group, the at least one fluorinated solvent is selected from the group consisting of fluorinated carbonate, fluorinated ether, fluorinated alkyl phosphate, fluorinated aromatic phosphate, fluorinated alkyl phosphonate, fluorinated aromatic phosphonate, fluorinated ester and fluorinated alkane.

Another embodiment of the invention is an electrochemical device that contains a positive electrode, a negative electrode, and any electrolytic solution disclosed elsewhere herein.

Yet another embodiment of the invention is a secondary battery comprising: (a) an anode, (b) a cathode, and (c) an electrolytic solution, comprising (i) a lithium salt, (ii) a non fluorinated carbonate, (iii) a phosphazene, (iv) a fluorinated compound selected from the group consisting of fluorinated ester, fluorinated alkanes, an organic phosphate or organic phosphonate compound selected from the group consisting of fluorinated alkyl phosphate, fluorinated aromatic phosphate, fluorinated alkyl phosphonate and fluorinated aromatic phosphonate, and/or fluorinated carbonate, fluorinated ether.

An embodiment of the invention is a secondary battery comprising: (a) an anode, (b) a cathode, and (c) an electrolytic solution, comprising (i) a lithium salt, (ii) a non-fluorinated carbonate, (iii) a phosphazene, and (iv) a fluorinated compound, and (v) at least one of an organic phosphate and an organic phosphonate.

Such electrolytic solutions help to prevent or reduce flammability in a lithium secondary battery. Beneficial side effects may include the formation of a solid-electrolyte interface (SEI) on the negative electrode surface of the batteries, improved stability of the electrolytic solution, and increased interaction between the electrolytic solution and electrodes. This is due to the desirable breakdown of certain of the additives (phosphazenes, phosphates, and phosphonates) which coat the cathode to form a SEI. Batteries utilizing electrolytic solutions with such compositions have long life, high capacity retention, and fewer swelling problems.

Broadly, the invention provides a non-aqueous electrolytic solution which includes a lithium salt, a carbonate solvent, a phosphazene, a fluorinated compound selected from the group consisting of fluorinated carbonate, fluorinated ether, fluorinated ester, fluorinated alkane, and an organic phosphate or organic phosphonate compound selected from the group consisting of fluorinated alkyl phosphate, fluorinated aromatic phosphate, fluorinated alkyl phosphonate, and fluorinated aromatic phosphonate.

The electrolytic solution is useful in a lithium or lithium-ion battery. The battery includes an anode and a cathode. The major components including solvents, phosphazene, fluorinated solvent (including organic phosphates or organic phosphonates), anode, and cathode are each described in turn hereinbelow.

Solvents. The solvents to be used in the secondary batteries of the invention can be any of a variety of non-aqueous, aprotic, and polar organic compounds. Overall, the non-aqueous electrolytic solution comprises about 10% to about 99% by weight, preferably about 40% to about 97% by weight, and more preferably about 60% to about 95% by weight of the one or more solvents. Generally, the solvents may be carbonates, carboxylates, ethers, ketones, lactones, sulfones, phosphates, nitriles, and ionic liquids. Useful additional carbonate solvents herein include, but are not limited to: cyclic carbonates, such as propylene carbonate and butylene carbonate, and linear carbonates, such as dimethyl carbonate, diethyl carbonate, dipropyl carbonate, dibutyl carbonate, ethyl methyl carbonate, methyl propyl carbonate, and ethyl propyl carbonate. Useful carboxylate solvents include, but are not limited to: methyl formate, ethyl formate, propyl formate, butyl formate, methyl acetate, ethyl acetate, propyl acetate, butyl acetate, methyl propionate, ethyl propionate, propyl propionate, butyl propionate, methyl butyrate, ethyl butyrate, propyl butyrate, and butyl butyrate. Useful ethers include, but are not limited to: tetrahydrofuran, 2-methyl tetrahydrofuran, 1,3-dioxolane, 1,4-dioxane, 1,2-dimethoxyethane, 1,2-diethoxyethane, and 1,2-dibutoxyethane. Useful lactones include, but are not limited to: γ-butyrolactone, 2-methyl-γ-butyrolactone, 3-methyl-γ-butyrolactone, 4-methyl-γ-butyrolactone, β-propiolactone, and δ-valerolactone. Useful phosphates include, but are not limited to: trimethyl phosphate, triethyl phosphate, tris(2-chloroethyl)phosphate, tripropyl phosphate, tri-isopropyl phosphate, tributyl phosphate, trihexyl phosphate, triphenyl phosphate, tritolyl phosphate, methyl ethylene phosphate, and ethyl ethylene phosphate. Useful sulfones include, but are not limited to: non-fluorinated sulfones, such as dimethyl sulfone and ethyl methyl sulfone, partially fluorinated sulfones, such as methyl trifluoromethyl sulfone, ethyl trifluoromethyl sulfone, methyl pentafluoroethyl sulfone, and ethyl pentafluoroethyl sulfone, and fully fluorinated sulfones, such as di(trifluoromethyl)sulfone, di(pentafluoroethyl)sulfone, trifluoromethyl pentafluoroethyl sulfone, trifluoromethyl nonafluorobutyl sulfone, and pentafluoroethyl nonafluorobutyl sulfone. Useful nitriles include, but are not limited to: acetonitrile, propionitrile, and butyronitrile. Two or more of these solvents may be used in the electrolytic solution. Other solvents may be utilized as long as they are non-aqueous and aprotic, and are capable of dissolving the salts, such as N,N-dimethyl formamide, N,N-dimethyl acetamide, N,N-diethyl acetamide, and N,N-dimethyl trifluoroacetamide. Carbonates are preferred, with the most preferred being ethylene carbonate and ethyl methyl carbonate.

Further additions to the electrolytic solution may include, but are not limited to, one or more of the following performance enhancing additives: SET former, overcharge protection agent, anti-swelling agent, low temperature or high temperature performance enhancers, such as vinylene carbonate, propylene sultone, vinyl ethylene carbonate, 4-methylene-1,3-dioxolan-2-one, and 4,5-dimethylene-1,3-dioxolan-2-one, and others such as biphenyl, iso-propyl benzene, hexafluorobenzene. The total concentration of such additives in the solution preferably does not exceed about 20 vol %, and is preferably less than about 15 vol %, more preferably less than about 10 vol %. Alternatively such additives are present at a collective total of less than about 5 vol % of the solution. The additives are present at a collective total of at least 0.01 vol %, preferably at least 0.1 vol %, such as 0.5%, 1.0% or 1.5%, for example.

Phosphazene. Phosphazenes are a class of chemical compounds having a phosphorus atom covalently linked to a nitrogen atom by a double bond and to two or more other atoms or radicals by single bonds or double bonds.

Broadly, the phosphazenes useful in the electrolytic solutions set forth by this invention are represented by the structure $(PNX^1X^2X^3X^4X^5)_n$, where $X^1$-$X^5$ are substituents that are independently selected from the group consisting of nothing, halogen, oxygen, sulfur, alkyl, alkoxyl, phenyl, phenoxyl, or siloxyl, with the proviso that at least one substituent X is present, and is/or contains fluorine, and n is 1-4. A number n P—N centers are thereby created. Substituents $X^1$-$X^5$ are independently selected for each P—N center meaning that up to 5n unique substituents can be present in the phosphazene.

When n=1 the P—N center of the phosphazene is linear and the up to five substituents $X^1$-$X^5$ may be bonded to the P or to the N. In such cases typically three substituents X are bound to P and one is bound to N. When n=2 or more a polyphosphazene ring structure is formed as the center, and the ring has up to 2n substituents, all bound to a P atom. Exemplary substituents include halogen, O, S, alkyl group, alkoxyl group, phenyl group, phenoxyl group, or siloxyl group. The alkyl group, alkoxyl, phenyl, phenoxyl, or siloxyl groups may themselves contain substituents chosen from halogen, oxygen, and sulfur. In one embodiment of the invention, at least half the substituents in the phosphazene compounds are fluorine or fluorinated.

Furthermore, the phosphazene used in this invention may be the tautomer of the above described phosphazenes, in this case, the double bond between the P atom and N atom becomes a single bond and one additional substituent is attached to the P atom and one additional substituent is attached to the N atom. In such case, the phosphazene compound may change to phosphamide. Phosphamides that are tautomers of phosphazenes are included in the meaning of "phosphazene" herein.

The amount of phosphazene present in the electrolytic solutions of the invention can be from 0.01 to 20 vol %, preferably 0.01-15 vol %, more preferably 0.5-10 vol %, alternately 0.1-10 vol % or 0.1-5 vol %, for example 1 vol %, 1.5 vol %, 2 vol %, 2.5 vol %, 3 vol %, 3.5 vol %, 4 vol %, 4.5 vol %, 5 vol %, 5.5 vol %, 6 vol %, 6.5 vol %, 7 vol %, 7.5 vol %, 8 vol %, 8.5 vol %, 9 vol % or 9.5 vol % or values in between.

Suitable phosphazenes (singly or in combination) include, but are not limited to: ethoxyl-pentafluorocyclotriphosphazene, phenoxyl-pentafluorocyclotriphosphazene, diethoxyl-tetrafluorocyclotriphosphazene, methyl-trifluorophophazene, ethyl-trifluorophophazene, N,N-dimethyl-difluorophosphamide, and methoxyethoxyl-pentafluorotriphosphazene.

Fluorinated Solvent. Distinct from the carbonate solvents disclosed herein above, the electrolytic solution of the invention includes at least one fluorinated compound selected from the group consisting of fluorinated carbonates, fluorinated ethers, fluorinated esters, fluorinated alkanes. The fluorinated solvent may be partially or fully fluorinated. Examples include: fluorinated ethers, such as 3-(1,1,2,2-tetrafluoroethoxy)-(1,1,2,2-tetrafluoro)-propane, pentafluoropropyl methyl ether, pentafluoropropyl fluoromethyl ether, pentafluoropropyl trifluoromethyl ether, 4,4,4,3,3,2,2-heptafluorobutyl difluoromethyl ether, 4,4,3,2,2-pentafluorobutyl 2,2,2-trifluoroethyl ether, methyl nonafluorobutyl ether, ethyl nonafluorobutyl ether, 2-difluoromethoxy-1,1,1-trifluoroethane, and 2-difluoromethoxy-1,1,1,2-tetrafluoroethane; fluorinated carbonates, such as fluoroethylene carbonate, bis(fluoromethyl)carbonate, bis(fluoroethyl)carbonate, fluoroethyl fluoromethyl carbonate, methyl fluoromethyl carbonate, ethyl fluoroethyl carbonate, ethyl fluoromethyl carbonate, methyl fluoroethyl carbonate, bis(2,2,2-trifluoroethyl)carbonate, 2,2,2-trifluoroethyl methyl carbonate, and 2,2,2-trifluoroethyl propyl carbonate. Also suitable are fluorinated esters, such as (2,2,3,3-tetrafluoropropyl)formate, methyl trifluoroacetate, ethyl trifluoroacetate, propyl trifluoroacetate, trifluoromethyl trifluoroacetate, trifluoroethyl trifluoroacetate, perfluoroethyl trifluoroacetate, and (2,2,3,3-tetrafluoropropyl)trifluoroacetate, 2,2,2-trifluoroethyl propionate, ethyl 2,2,2-trifluoroacetate; and fluorinated alkanes, such as n-$C_4F_9C_2H_5$, n-$C_6F_{13}C_2H_5$, n-$C_8F_{16}H$, perfluoropentane, and 1,1,2,2-tetrafluorocyclohexane.

The amount of fluorinated solvents present in the electrolytic solutions of the invention can be from 0.01 to 20 vol %, preferably 1-15 vol %, more preferably 1-10 vol %, alternately 0.1-10 vol % or 0.1-5 vol %, for example 1 vol %, 1.5 vol %, 2 vol %, 2.5 vol %, 3 vol %, 3.5 vol %, 4 vol %, 4.5 vol %, 5 vol %, 5.5 vol %, 6 vol %, 6.5 vol %, 7 vol %, 7.5 vol %, 8 vol %, 8.5 vol %, 9 vol % or 9.5 vol % or values in between.

Organic Phosphate or Organic Phosphonate. Exemplary organic phosphate and organic phosphonate compounds include fluorinated alkyl phosphates, such as tris(2,2,2-trifluoroethyl)phosphate, tris(1,1,2,2-tetrafluoroethyl)phosphate, tris(hexafluoro-isopropyl)phosphate, (2,2,3,3-tetrafluoropropyl)dimethyl phosphate, bis(2,2,3,3-tetrafluoropropyl)methyl phosphate, and tris(2,2,3,3-tetrafluoropropyl)phosphate; fluorinated aromatic phosphates, such as tris(4-fluorophenyl)phosphate and pentafluorophenyl phosphate. Fluorinated alkyl phosphonates include trifluoromethyl dimethylphosphonate, trifluoromethyl di(trifluoromethyl)phosphonate, and (2,2,3,3-tetrafluoropropyl)dimethylphosphonate; fluorinated aromatic phosphonate, such as phenyl di(trifluoromethyl)phosphonate and 4-fluorophenyl dimethylphosphonate, are suitable. Combinations of any of the foregoing are also suitable.

In general, organic phosphate/phosphonates are suitable which are partially or fully fluorinated.

The amount of organic phosphate/phosphonate present in the electrolytic solutions of the invention can be from 0.01 to 20 vol %, preferably 0.1-15 vol %, more preferably 1-10 vol %, alternately 0.1-10 vol % or 0.1-5 vol %, for example 1 vol %, 1.5 vol %, 2 vol %, 2.5 vol %, 3 vol %, 3.5 vol %, 4 vol %, 4.5 vol %, 5 vol %, 5.5 vol %, 6 vol %, 6.5 vol %, 7 vol %, 7.5 vol %, 8 vol %, 8.5 vol %, 9 vol % or 9.5 vol % or values in between.

Salts. The solute of the electrolytic solution of the invention is an ionic salt containing at least one positive ion. Typically this positive ion is lithium ($Li^+$). The salts herein function to transfer charge between the negative electrode and the positive electrode of the battery system. The lithium salts are preferably halogenated, for example, $LiPF_6$, $LiBF_4$, $LiSbF_6$, $LiAsF_6$, $LiTaF_6$, $LiAlCl_4$, $Li_2B_{10}Cl_{10}$, $Li_2B_{10}F_{10}$, $LiClO_4$, $LiCF_3SO_3$, $Li_2B_{12}F_xH_{(12-x)}$ wherein x=0-12; $LiPF_x(R_F)_{6-x}$ and $LiBF_y(R_F)_{4-y}$ wherein $R_F$ represents perfluorinated $C_1$-$C_{20}$ alkyl groups or perfluorinated aromatic groups, x=0-5 and y=0-3, $LiBF_2[O_2C(CX_2)_nCO_2]$, $LiPF_2[O_2C(CX_2)_nCO_2]_2$, $LiPF_4[O_2C(CX_2)_nCO_2]$, wherein X is selected from the group consisting of H, F, Cl, $C_1$-$C_4$ alkyl groups and fluorinated alkyl groups, and n=0-4, $LiN(SO_2C_mF_{2m+1})(SO_2C_nF_{2n+1})$, and $LiC(SO_2C_kF_{2k+1})(SO_2C_mF_{2m+1})(SO_2C_nF_{2n+1})$, wherein k=10, m=1-10, and n=1-10, respectively, $LiN(SO_2C_pF_{2p}SO_2)$, and $LiC(SO_2C_pF_{2p}SO_2)(SO_2C_qF_{2q+1})$ wherein p=1-10 and q=1-10, lithium salts of chelated orthoborates and chelated orthophosphates such as lithium bis(oxalato)borate [$LiB(C_2O_4)_2$], lithium bis(malonato)borate [$LiB(O_2CCH_2CO_2)_2$], lithium bis(difluoromalonato)borate [$LiB(O_2CCF_2CO_2)_2$], lithium (malonato oxalato)borate [$LiB(C_2O_4)(O_2CCH_2CO_2)$], lithium (difluoromalonato oxalato)borate [$LiB(C_2O_4)(O_2CCF_2CO_2)$], lithium tris(oxalato)phosphate [$LiP(C_2O_4)_3$], and lithium tris(difluoromalonato)phosphate [$LiP(O_2CCF_2CO_2)_3$], and any combination of two or more of the aforementioned salts. Most preferably the electrolytic solution comprises $LiPF_6$.

The concentration of the salts in the electrolytic solution may be any concentration, with normal ranges from 0.1 to 3.0 M (mol/liter), preferably 0.2 to 2.8 M, more preferably 0.3 to 2.5M, more preferably 0.4 to 2 M, and more preferably 0.5 to 1.5M.

Cathode. The cathode comprises at least one lithium transition metal oxide (LiMO), lithium transition metal phosphate ($LiMPO_4$), or lithium transition metal fluorosilicate ($LiMSiO_xF_y$). Lithium transition metal oxides contain at least one metal selected from the group consisting of Mn, Co, Cr, Fe, Ni, V, and combinations thereof. For example, the following LiMOs may be used in the cathode: $LiCoO_2$, $LiMnO_2$, $LiMn_2O_4$, $Li_2Cr_2O_7$, $Li_2CrO_4$, $LiNiO_2$, $LiFeO_2$, $LiNi_xCo_{1-x}O_2$ (0<x<1), $LiMn_zNi_{1-z}O_2$ (0<z<1) (which includes $LiMn_{0.5}Ni_{0.5}O_2$), $LiMn_{1/3}Co_{1/3}Ni_{1/3}O_2$, $LiMc_{0.5}Mn_{1.5}O_4$, wherein Mc is a divalent metal, and $LiNi_xCo_yMe_zO_2$ wherein Me may be one or more of Al, Mg, Ti, B, Ga, or Si and 0<x,y,z<1. Lithium transition metal phosphate ($LiMPO_4$) such as $LiFePO_4$, $LiVPO_4$, $LiMnPO_4$, $LiCoPO_4$, $LiNiPO_4$, $LiMn_xMc_yPO_4$, where Mc may be one of or of Fe, V, Ni, Co, Al, Mg, Ti, B, Ga, or Si and $0<x,y<1$. Furthermore, transition metal oxides such as $MnO_2$ and $V_2O_5$, transition metal sulfides such as $FeS_2$, $MoS_2$, and $TiS_2$, and conducting polymers such as polyaniline and polypyrrole may be present. The preferred positive electrode material is the lithium transition metal oxide, especially, $LiCoO_2$, $LiMn_2O_4$, $LiNi_{0.80}Co_{0.15}Al_{0.05}O_2$, $LiFePO_4$, $LiMnPO_4$, and $LiNi_{1/3}Mn_{1/3}CO_{1/3}O_2$. The stoichiometry of elements in the above molecular formulations does not need to be integral. For example, the material could be lithium rich or lithium deficient, that is, the lithium number in the above formula could be larger or smaller than one. Mixtures of such oxides may also be used.

Anode. The anode material is selected from lithium metal, lithium alloys, carbonaceous materials, and lithium metal oxides capable of being intercalated and de-intercalated with lithium ions. Carbonaceous materials useful herein include graphite, amorphous carbon, and other carbon materials such as activated carbon, carbon fiber, carbon black, and mesocarbon microbeads. Lithium metal anodes may be used. Lithium MMOs (mixed-metal oxides) such as $LiMnO_2$ and $Li_4Ti_5O_{12}$ are also envisioned. Alloys of lithium with transition or other metals (including metalloids) may be used, including LiAl, LiZn, $Li_3Bi$, $Li_3Cd$, $Li_3Sb$, $Li_4Si$, $Li_{4.4}Pb$, $Li_{4.4}Sn$, $LiC_6$, $Li_3FeN_2$, $Li_{2.6}CO_{0.4}N$, $Li_{2.6}Cu_{0.4}N$, and combinations thereof. The anode may further comprise an additional material such as a metal oxide including SnO, $SnO_2$, GeO, $GeO_2$, $In_2O$, $In_2O_3$, PbO, $PbO_2$, $Pb_2O_3$, $Pb_3O_4$, $Ag_2O$, AgO, $Ag_2O_3$, $Sb_2O_3$, $Sb_2O_4$, $Sb_2O_5$, SiO, ZnO, CoO, NiO, FeO, and combinations thereof.

Either the anode or the cathode, or both, may further comprise a polymeric binder. In the preferred embodiment, the binder may be polyvinylidene fluoride, styrene-butadiene rubber, cellulose, polyamide or melamine resin, and combinations thereof.

Various embodiments of the invention are set forth in Table 1.

TABLE 1

Ranges of constituents in non-aqueous electrolytic solutions.

| Constituent | wt % | | | | |
|---|---|---|---|---|---|
| Lithium salt | 5-25 | 8-20 | 10-18 | 10-15 | 12-14 |
| Carbonate solvent | 35-85 | 40-80 | 45-75 | 50-70 | 55-70 |
| Phosphazene solvent | 0.01-15 | 0.1-8 | 1-7 | 1-6 | 2-6 |
| Fluorinated solvent | 0.1-30 | 1-25 | 5-20 | 10-20 | 10-15 |
| Organic phosphate/phosphonate | 0-20 | 1-15 | 5-20 | 10-20 | 10-15 |

It is envisioned that the electrolytic solutions and batteries discussed herein have a wide range of applications, including, at least, calculators, wrist watches, hearing aids, electronics, such as computers, cell phones, and games, and transportation applications, such as battery powered and/or hybrid vehicles.

The following compositions and batteries represent exemplary embodiments of the invention. They are presented to further explain the invention in more detail, and do not limit the invention as set forth herein.

Examples. Flammability of Lithium Ion Battery Electrolytic Solution. The SET (self-extinguishing time) test is widely used to check the flammability of lithium ion battery electrolytic solutions. The test is carried out in a fume hood. A glass wool ball of approximately 1 cm diameter is placed in the center of an aluminum cup and 0.6 g of electrolytic solution is dropped into the ball. A propane gas flame is then brought into contact with the ball for about a second. The propane gas source is then moved away. If the electrolytic solution catches fire, flame will sustain and the SET time is measured from when the source was removed until the flame self extinguishes. If the electrolytic solution does not catch fire, the SET time will be recorded as 0. The same electrolytic solution is tested as described above for three to five trials and the average SET is obtained by dividing the sum total burned time by the number of trials. The electrolytic solution is considered non-flammable if its average SET time is, or is close to, 0. Up to five trials were performed in an attempt to cause the indicated electrolytic solutions to burn.

The electrolytic solution was prepared by mixing set amounts of salts and solvents together. EC, EMC, DMC, and DEC are common carbonate solvents. Modification of these solvents involves substituting some of the carbon, oxygen, or hydrogen with other elements, such as sulfur, phosphorus, nitrogen, and fluorine, or adding branches and unsaturated bonds.

A solution of 1M LiPF6 EC/EMC 3/7v is highly flammable, see Table 2, run 1. Addition of 3% FPE (N-ethoxylpentafluorocyclotriphosphazene) alone does not make an appreciable difference in Run 1a. Runs 1 and 1a may be termed baseline runs. Addition of 10% or 20% (1,1,2,2-tetrafluoro)-3-(1,1,2,2-tetrafluoroethoxy)-propane (a fluoroether), herein identified as FE2, in Runs 3 and 2, respectively, as the sole additive does little to reduce flammability. However, the electrolytic solution becomes non-flammable when the combination of 10% FE2 and 4% wt FPE is utilized, as in Run 4. Even when the amount of FPE is reduced to 2%, in Run 5 (while maintaining 10% FE2), the electrolytic solution retains low flammability characteristics, only being ignited after prolonged exposure to the propane flame on the fourth trial and then burning slowly.

In another embodiment, Run 6, 20% TFEP (tris(2,2,2-trifluoroethyl)phosphate) in 1M LiPF6 EC/EMC 3/7v solution is still flammable. However, after an addition of 2% FPE, Run 9, the solution becomes non-flammable. Even when the concentration of TFEP is reduced to 10%, the addition of 2% FPE, Run 10, provides non-flammable characteristics for the electrolytic solution.

Fluorinated carbonates can be non-flammable by themselves. For example, 1M LiPF6 in EC/FDMC 1/1v, where FDMC is fluorinated dimethylene carbonate, is non-flammable, see

| Run | Composite | SET 1 | SET 2 | SET 3 | SET 4 | SET 5 | Avg SET (s) |
|---|---|---|---|---|---|---|---|
| 1 | STD: 1M LiPF6 EC/EMC 3/7v | 91.69 | 80 | 69.47 | 64.5 | 65.22 | 74.18 |
| 1a | 3% FPE | 72.25 | 56.31 | 71.1 | 65.22 | 69.44 | 66.86 |
| 2 | 20% FE2 | 54.62 | 73.16 | 57.57 | 61.31 | 54.95 | 60.32 |
| 3 | 10% FE2 | 65.12 | 58.25 | 45.56 | 56.21 | 58.87 | 56.80 |
| 4 | 10% FE2 + 4% FPE | 0 | 0 | 0 | 0 | — | 0 |
| 5 | KJ0: 10% FE2 + 2% FPE | 2.03 | 0 | 0 | 67.09 | — | 17.28 |

-continued

| Run | Composite | SET 1 | SET 2 | SET 3 | SET 4 | SET 5 | Avg SET (s) |
|---|---|---|---|---|---|---|---|
| 6 | 20% TFEP | 20.19 | 23.93 | 41.47 | 23 | 22.66 | 26.25 |
| 7 | 10% TFEP | 38.6 | 35.69 | 54.38 | 46.94 | 40.06 | 43.13 |
| 8 | 20% TFEP + 4% FPE | 0 | 0 | 0 | 0 | — | 0 |
| 9 | 20% TFEP + 2% FPE | 0 | 0 | 0 | 0 | — | 0 |
| 10 | J4E0: 10% TFEP + 2% FPE | 0 | 0 | 0 | — | — | 0 |
| 11 | 1M LiPF6 EC/FDMC 1/1v | 0 | 0 | 0 | 0 | 0 | 0 |
| 12 | B0: 1M LiPF6 EC/EMC/DMC 1/1/2w + 1% VC | 69.62 | 65.75 | 57.54 | 64.19 | 66.28 | 64.68 |
| 13 | B1: 1M LiPF6 EC/EMC/FDMC 1/1/2w + 1% VC | 76 | 77.6 | 83.35 | 77.15 | 73.62 | 77.54 |
| 14 | B3: 1M LiPF6 EC/EMC/FDMC 1/1/2w + 1% VC + 2% FPE | 0 | 0 | 0 | — | — | 0 |

Run 11. However, when the linear carbonate EMC is incorporated into this solution it is highly flammable, in Runs 12 and 13. In another embodiment of the invention, an addition of 2% FPE into 1M LiPF6 EC/EMC/FDMC 1/1/2 by volume solution makes it non-flammable, see Run 14.

Abbreviations in the table: FDMC=1,1'-fluoro dimethyl-carbonate (fluoro-carbonate); FE2=(1,1,2,2)-tetrafluoro-3-(1,1,2,2-tetrafluoroethoxy)-propane (fluoro ether); TFEP=tris(2,2,2-trifluoroethyl)phosphate; FPE=ethoxypentafluorocyclophosphazene; VC=vinylene carbonate.

Table 2: flammability test results of combined flame retardants.

Cell Preparation and Testing. Preparation of a Cathode. A positive electrode slurry was prepared by dispersing $LiCoO_2$ (as positive electrode active material, 90 wt %), poly(vinylidenefluoride) (PVdF) (as binder, 5 wt %), and acetylene black (as electro-conductive agent, 5 wt %) into 1-methyl-2-pyrrolidone (NMP). The slurry was coated on aluminum foil, dried, and compressed to give a positive electrode.

Preparation of an Anode. Artificial graphite (as negative electrode active material, 95 wt %) and PVdF (as binder, 5 wt %) were mixed into NMP to give a negative active material slurry which was coated on copper foil, dried, and pressed to give a negative electrode.

Preparation of Electrolytic Solutions. The Baseline Electrolytic solution is formed by blending 61.0 g $LiPF_6$ into 161.1 g EC and 277.9 g EMC to give 500 g baseline electrolytic solution. Blending 61.0 g $LiPF_6$, 50 g FE2, 142.8 g EC, 246.2 g EMC, and 10.2 g FPE together produces 510 g KJ0 electrolytic solution. Other solutions are made accordingly to have the recited amount of additive(s). One gram of VC added into 99 g KJ0 solution produces 100 g KJV electrolytic solution. Blending 61.0 g $LiPF_6$, 50 g TFEP, 142.8 g EC, 246.2 g EMC, and 10.2 g FPE together produces 510 g J4E0 electrolytic solution. One gram of VC added into 99 g J4E0 solution produces 100 g J4EV electrolytic solution.

In Table 3, below, formulations J4EV, and the final five formulations represent embodiments of the invention. Fluoroether is FE2; F-alkyl-phosphate is TFEP; phosphazene is FPE or FPE2 (phenoxy)-pentafluorotriphosphazene); fluorocarbonate is fluoroethylene carbonate (FEC) and phosphonate is dimethyl methylphosphonate (DMMP). The baseline electrolyte to which the above additives are added is 1M LiPF6 in a 3/7 volume ratio blend of ethylene carbonate (EC) and ethyl methyl carbonate (EMC).

TABLE 3

Capacity retention cycle testing at room temperature and high temperature, high temperature storage retention, and high temperature storage recovery.

| Electrolyte Formulation (weight percent) | 1st cycle RT discharge capacity (mAh) | RT cycle capacity retention at 200th cycle | HT Storage retained | HT Storage recovered | HT Cycle capacity retention at 180th cycle |
|---|---|---|---|---|---|
| standard(no additive) | 640.7 | 58.0% | 78.6% | 85.5% | 86.4% |
| 1% VC | 699.6 | 93.7% | | | 80.0% |
| 10% FE2 | 659.5 | 63.8% | 85.4% | 92.9% | 83.8% |
| 10% TFEP | 692.0 | 20.3% | 72.3% | 79.0% | 0.0% |
| 20% FPE | 662.8 | 90.6% | 82.1% | 91.9% | 81.9% |
| 10% FE2 + 2% FPE KJ0 | 687.6 | 85.0% | 80.5% | 90.4% | 0.0% |
| 10% TFEP + 2% FPE J4E0 | 665.3 | 71.2% | 78.3% | 88.6% | 0.0% |
| 10% FE2 + 2% FPE + 1% VC KJV | 696.2 | 96.7% | 83.8% | 95.2% | 86.4% |
| 10% TFEP + 2% FPE + 1% VC J4EV | 691.5 | 95.9% | 86.9% | 94.6% | 80.3% |
| 20% FE2 + 10% FPE | 687.7 | 92.6% | 78.5% | 84.3% | 78.9% |
| 10% FE2 + 3% FPE | 690.6 | 84.3% | 82.3% | 90.3% | 82.3% |
| 20% FE2 + 10% FPE + 1% VC | 652.9 | 94.7% | 86.8% | 91.0% | 88.9% |
| 10% FE2 + 3% FPE + 1% VC | 676.6 | 97.2% | 88.5% | 94.9% | 86.7% |
| 10% FE2 + 3% FEC + 3% FPE | 695.8 | 96.6% | 90.6% | 95.1% | 87.8% |
| 10% FE2 + 5% TFEP + 3% FPE2 | 687.8 | 77.0% | 84.4% | 92.5% | 78.5% |
| 5% FE2 + 10% TFEP + 3% FPE | 679.7 | 69.3% | 32.5% | 90.3% | 76.1% |
| 10% TFEP + 3% FEC + 5% FPE | 685.0 | 94.4% | 89.3% | 95.6% | 92.6% |
| 10% FE2 + 3% DMMP + 5% FPE | 589.8 | 72.0% | 73.5% | 83.2% | 77.7% |

Assembly of a Lithium Ion Secondary Battery. In a dry box under an inert atmosphere, a lithium ion secondary battery was assembled utilizing a prismatic cell. That is, an arrangement containing a microporous polypropylene separator, a cathode, another microporous polypropylene separator, and an anode were laid on top of one another and then wrapped tightly together. The assembly was then inserted into the opened end of a prismatic aluminum can. Current leads were attached to both the cathode and anode, with proper insulation against each other, and connections made to the outside terminals. The open end of the prismatic cell was then covered except for a small hole. Through this hole the inventive electrolytic solution was added to each of the batteries and allowed to absorb. Finally, a small steel ball was used to seal the cell, completing the assembly of the prismatic type lithium ion secondary battery.

Testing of the Batteries. Evaluation of the aforementioned assembled battery was carried out by an initial charging and discharging process (formation and capacity confirmation), followed by rate discharge, cycle life testing, high temperature storage and cycling, and low temperature discharge.

Rate Discharge. $LiCoO_2$/graphite cells were prepared with the standard 1M LiPF6EC/EMC 3/7v electrolytic solution (STD0), as well as the invented electrolyte containing 10% FE2+2% FPE (KJ0) and with 10% FE2+2% FPE+1% VC (KJV) in order to determine the battery performance of the flame retardant additives. As shown in FIG. 1, a wide variation was seen in the rate discharge of the cells. So although it is likely that FE2 might reduce the rate performance of the cell, it is not a significant divergence. The testing of FIG. 1 was carried out by charging the cells at C rate, then discharging at different rates according to the following schedule: cycle #3-5:C/5; cycle #6-8:C/2; cycle #9-11:1C; cycle #12-14:2C, cycle #15:3C; cycle #16 and #18:1C; cycle #17:5C.

Cycle Life. Cycle life testing was conducted at room temperature or 60° C., which was the "high temperature," sometimes indicated by "I-IT," by repeatedly charging and discharging the prepared cells according to the following schedule: charging the aforementioned initially charged/discharged battery at a constant current rate of C (700 mA) to 4.2 V and then charged at a constant voltage of 4.2 V until the current was less than or equal to 35 mA. The battery was then discharged at a constant current rate of C (700 mA) until the cut-off voltage 3.0 V was reached.

FIGS. 2 and 3 show the room temperature cycle life of the B0, B1, and B3 cells as well as the STD0, VC1, KJ0, KJV, J4E0, and J4EV cells. FIG. 2A shows results of FIG. 2 normalized and FIG. 3A shows results of FIG. 3 normalized. The STD0 cells have the lowest capacity retention, as shown in FIG. 3, where after only 35 cycles their capacity has already dropped 15%. Compared to the standard electrolytic solution standard, the cells containing the electrolytic solutions of the invention may have higher initial capacity and better cycle life.

Table 3 presents cycle testing of various combinations of electrolytes and additives up to 200 cycles for room temperature cycling capacity retention, high temperature storage retention, and high temperature storage recovery. High temperature cycling capacity retention is measured up to 180 cycles. The Room Temperature (RT) tests are carried out at 20° C. and the High Temperature (HT) tests are carried out at 60° C. The cells with a single flame retarding component, such as FE2, TFEP or FPE, either have low initial discharge capacity or poor capacity retention. The performance enhancement characteristic of current invention is best represented by the high temperature cycling capacity retention. Only the cells with 10% TFEP+3% FEC+5% FPE electrolyte have capacity retention higher than 90% at $180^{th}$ cycle at 60° C.

Certain embodiments of the invention are envisioned where at least some percentages, temperatures, times, and ranges of other values are preceded by the modifier "about." "Comprising" is intended to provide support for "consisting of" and "consisting essentially of." Where ranges in the claims of this provisional application do not find explicit support in the specification, it is intended that such claims provide their own disclosure as support for claims or teachings in a later filed non-provisional application. Numerical ranges of ingredients that are bounded by zero on the lower end (for example, 0-10 vol % VC) are intended to provide support for the concept "up to [the upper limit]," for example "up to 10 vol % VC," vice versa, as well as a positive recitation that the ingredient in question is present in an amount that does not exceed the upper limit. An example of the latter is "comprises VC, provided the amount does not exceed 10 vol %." A recitation such as "8-25 vol % (EC+MEC+VC)" means that any or all of EC, MEC and/or VC may be present in an amount of 8-25 vol % of the composition.

While the invention herein disclosed has been described by means of specific embodiments and applications thereof, numerous modifications and variations could be made thereto by those skilled in the art without departing from the scope of the invention set forth in the claims. Furthermore, various aspects of the invention may be used in other applications than those for which they were specifically described herein.

The invention claimed is:

1. An electrolytic solution comprising a lithium salt and a solvent,
   a. wherein the solvent comprises
      i. at least one of a nonfluorinated cyclic carbonate and a nonfluorinated linear carbonate,
      ii. at least one phosphazene compound represented by the structure $(PNX^1X^2X^3X^4X^5)_n$, wherein n=1 to 4, thereby creating n P—N centers, wherein $X^1$-$X^5$ are substituents that are, for each P—N center, independently selected from the group consisting of nothing, halogen, oxygen, sulfur, alkyl, alkoxyl, alkoxy-alkoxyl (ROR'O—, where R and R' is any alkyl group), phenyl, phenoxyl, or siloxyl, with the proviso that at least one substituent X is present, and is/or contains fluorine, where the amount of the phosphazene compounds are 0.01 to 10 vol percent of the electrolytic solution, and
      iii. at least one fluorinated solvent, wherein the amount of the fluorinated solvent is 8.5 to 20 vol percent;
      iv. when n in the phosphazene formula is 3 and $X^1$-$X^5$ do not include alkyoxy-alkoxyl, the at least one fluorinated solvent is selected from the group consisting of, fluorinated aromatic phosphate, fluorinated alkyl phosphonate, fluorinated aromatic phosphonate, fluorinated ester and fluorinated alkane; and
      v. when n in the phosphazene formula is 1, 2, or 4, or when n in the phosphazene formula is 3 and $X^1$-$X^5$ include at least one alkyoxy-alkoxyl group, the at least one fluorinated solvent is selected from the group consisting of fluorinated carbonate and fluorinated ether, fluorinated aromatic phosphate, fluorinated alkyl phosphonate, fluorinated aromatic phosphonate, fluorinated ester and fluorinated alkane where at least half the substituents in the phosphazene compounds are luorine or fluorinated, wherein the fluorinated ethers are selected from the group consisting of 3-(1,1,2,2- tetrafluoroethoxy)-(1,1,2,2-tetrafluoro)-propane, pentafluoropropyl methyl ether, pentafluoropropyl fluoromethyl ether, pentafluoropropyl trifluoromethyl ether, 4,4,4,3,3,2,2-heptafluorobutyl difluoromethyl ether, 4,4,3,2,2-pentafluorobutyl 2,2,2-trifluoroethyl ether, methyl nonafluorobutyl ether, ethyl nonafluorobutyl ether, 2-difluoromethoxy-1,1,1-trifluoroethane, and 2-difluoromethoxy-1,1,1,2-tetrafluoroethane.

2. An electrolytic solution comprising a lithium salt and a solvent, a. wherein the solvent comprises
  i. at least one of a nonfluorinated cyclic carbonate and a nonfluorinated linear carbonate,
  ii. at least one phosphazene compound represented by $(PNX^1X^2X^3X^4X^5)_n$, wherein n is 1-4, thereby creating n P—N centers, wherein, $X^1$-$X^5$ are substituents that are, for each P—N center, independently selected from the group consisting of nothing, halogen, oxygen, sulfur, alkyl, alkoxyl, phenyl, phenoxyl, and siloxyl, with the proviso that at least one substituent X is present, and is/or contains fluorine,
  iii. at least one fluorinated solvent selected from the group consisting of fluorinated carbonate, fluorinated ether, fluorinated ester, fluorinated alkane, the fluorinated ethers are selected from the group consisting of 3-(1,1,2,2-tetrafluoroethoxy) -(1,1,2,2-tetrafluoro)-propane, pentafluoropropyl methyl ether, pentafluoropropyl fluoromethyl ether, pentafluoropropyl trifluoromethyl ether, 4,4,4,3,3,2,2-heptafluorobutyl difluoromethyl ether, 4,4,3,2,2-pentafluorobutyl 2,2,2-trifluoroethyl ether, methyl nonafluorobutyl ether, ethyl nonafluorobutyl ether, 2-difluoromethoxy-1,1,1-trifluoroethane, and 2-difluoromethoxy-1,1,1,2-tetrafluoroethane; wherein the amount of the fluorinated solvents are 8.5 to 20 vol percent; and
  iv. at least one of a fluorinated organic phosphate or a fluorinated organic phosphonate selected from the group of fluorinated alkyl phosphate, fluorinated aromatic phosphate, fluorinated alkyl phosphonate, and fluorinated aromatic phosphonate.

3. The electrolytic solution according to claim 1, where the amount of fluorinated solvents are 10 to 20 vol percent.

4. The electrolytic solution according to claim 2, comprising at least one fluorinated organic phosphate/phosphonate selected from the group consisting of fluorinated alkyl phosphate, fluorinated aromatic phosphate, fluorinated alkyl phosphonate and fluorinated aromatic phosphonate in an amount of 0.01 to 20 vol percent.

5. The electrolytic solution according to claim 1, where the fluorinated solvents are partially or fully fluorinated.

6. The electrolytic solution according to claim 2, comprising at least one fluorinated organic phosphate/phosphonate selected from the group consisting of fluorinated alkyl phosphate, fluorinated aromatic phosphate, fluorinated alkyl phosphonate and fluorinated aromatic phosphonate which is fully fluorinated.

7. The electrolytic solution according to claim 1, where the phosphazene is fluorinated and is selected from the group consisting of ethoxyl-pentafluorotriphosphazene, phenoxyl-pentafluorotriphosphazene, diethoxyl-tetrafluorotriphosphazene, N,N-dimethyl-difluorophosphamide, and methoxyethoxyl-pentafluorotriphosphazene, and combinations thereof.

8. The electrolytic solution according to claim 2, wherein a fluorinated alkyl phosphate is present and is selected from the group consisting of tris(2,2,2-trifluoroethoxyl)phosphate and tris(hexafluoro-isopropyl)phosphate, and combinations thereof.

9. The electrolytic solution according to claim 1, where a fluorinated ether is present and is 3-(1,1,2,2-tetrafluoroethoxy)-(1,1,2,2-tetrafluoro)-propane.

10. The electrolytic solution according to claim 1, wherein a fluorinated carbonate is present and is selected from the group consisting of fluoroethylene carbonate, bis(fluoromethyl) carbonate, bis(fluoroethyl) carbonate, fluoroethyl fluoromethyl carbonate, methyl fluoromethyl carbonate, ethyl fluoroethyl carbonate, ethyl fluoromethyl carbonate, methyl fluoroethyl carbonate, and combinations thereof.

11. The electrolytic solution according to claim 1, comprising at least one of a fluorinated ester and fluorinated alkane is selected from the group consisting of (2,2,3,3-tetrafluoropropyl)trifluoroacetate, perfluoropentane, 1,1,2,2-tetrafluoro cyclohexane, 2,2,2-trifluoroethyl propionate, ethyl 2,2,2-trifluoroacetate and combinations thereof.

12. The electrolytic solution according to claim 1, comprising at least one fluorinated phosphonate/phosphonate selected from the group consisting of trifluoromethyl dimethylphosphonate, trifluoromethyl di(trifluoromethyl)phosphonate, (2,2,3,3-tetrafluoropropyl)dimethylphosphonate; phenyl di(trifluoromethyl)phosphonate, 4-fluorophenyl dimethylphosphonate, and combinations thereof.

13. The electrolytic solution according to claim 1, wherein the electrolyte further comprises at least one performance enhancing additive selected from the group consisting of SEI former, overcharge protection agent, antiswelling agent, low temperature performance enhancer, high temperature performance enhancer, vinylene carbonate, propylene sultone, vinyl ethylene carbonate, 4-methylene-1,3-dioxolan-2-one, and 4,5-dimethylene-1,3-dioxolan-2-one, biphenyl, iso-propyl benzene, hexafluorobenzene.

14. An electrochemical device that includes a positive electrode, a negative electrode, and the electrolytic solution of claim 1.

15. A secondary battery comprising: a. an anode, b. a cathode, and c. an electrolytic solution according to claim 1.

16. The secondary battery of claim 15, wherein the electrolytic solution comprises at least one phosphazene compound selected from the group consisting of ethoxyl-pentafluorocyclotriphosphazene, phenoxyl-pentafluorocyclotriphosphazene, di ethyl-tetrafluorocyclotriphosphazene, methyl-trifluorophophazene, ethyl-trifluorophophazene, and combinations thereof.

17. The secondary battery of claim 15, wherein the electrolytic solution comprises at least one phosphazene compound present in an amount of 0.01-10 vol. percent of the electrolytic solution.

18. The secondary battery of claim 15, wherein the electrolytic solution comprises at least one fluorinated solvent selected from the group consisting of bis(2,2,2-trifluoroethyl)carbonate, 2,2,2-trifluoroethyl methyl carbonate, fluoroethylene carbonate, 2,2,2-trifluoroethyl propyl carbonate, tris(2,2,2-trifluoroethoxyl)phosphate, 3-(1,1,2,2-tetrafluoroethoxy)-1,1,2,2-tetrafluoropropane, and combinations thereof.

19. The secondary battery of claim 15, wherein the electrolytic solution comprises a salt selected from the group consisting of $LiBF_4$, $LiSbF_6$, $LiAsF_6$, $LiTaF_6$, $LiAlCl_4$, $Li_2B_{10}Cl_{10}$, $Li_2B_{12}F_xH_{(12-x)}$ wherein x=0-12, $LiB(C_2O_4)_2$, $LiB(O_2CCH_2CO_2)_2$, $LiB(O_2CCF_2CO_2)_2$, $LiB(C_2O_4)(O_2CCH_2CO_2)$, $LiB(C_2O_4)(O_2CCF_2CO_2)$, $LiP(C_2O_4)_3$, $LiP(O_2CCF_2CO_2)_3$, $LiClO_4$, $LiCF_3SO_3$; $LiN(SO_2C_mF_{2m+1})(SO_2C_nF_{2n+1})$, $LiC(SO_2C_kF_{2k+1})(SO_2C_mF_{2m+1})(SO_2C_nF_{2n+1})$, wherein k=1-10, m=1-10, and n=1-10, respectively, $LiN(SO_2C_pF_{2p}SO_2)$, and $LiC(SO_2C_pF_{2p}SO_2)(SO_2C_qF_{2q+1})$ wherein p=1-10 and q=1-10, $LiPF_x(R_F)_{6-x}$ and $LiBF_y(R_F)_{4-y}$, wherein $R_F$ represents perfluorinated $C_1$-$C_{20}$ alkyl groups or perfluorinated aromatic groups, x=0-5, and y=0-3, $LiBF_2[O_2C(CX_2)_nCO_2]$, $LiPF_2[O_2C(CX_2)_nCO_2]_2$, $LiPF_4[O_2C(CX_2)_nCO_2]$, wherein X is selected from the group consisting of H, F, Cl, $C_1$-$C_4$ alkyl groups and fluorinated alkyl groups and n=0-4, and combinations thereof.

20. The secondary battery of 15, wherein the cathode comprises a lithium mixed metal oxide selected from the group consisting of $LiCoO_2$, $LiMnO_2$, $LiMn_2O_4$, $Li_2Cr_2O_7$, $Li_2CrO_4$, $LiNiO_2$, $LiFeO_2$, $LiNi_xCo_{1-x}O_2$ (0<x<1), $LiFePO_4$, $LiVPO_4$, $LiMnPO_4$, $LiNiPO_4$, $LiMn_{0.5}Ni_{0.5}O_2$, $LiMn_{1/3}Co_{1/3}Ni_{1/3}O_2$, $LiNi_xCo_yMe_zO_2$ wherein Me may be one or more of Al, Mg, Ti, B, Ga, or Si and 0<x,y,z<1, and $LiMc_{0.5}Mn_{1.5}O_4$ wherein Mc is a divalent metal, and mixtures thereof.

21. The secondary battery of 15, wherein the anode comprises a material selected from the group consisting of carbonaceous material, lithium metal, $LiMnO_2$, LiAl, LiZn, $Li_3Bi$, $Li_3Cd$, $Li_3Sb$, $Li_4Si$, $Li_{4.4}Pb$, $Li_{4.4}Sn$, $LiC_6$, $Li_3FeN_2$, $Li_{2.6}Co_{0.4}N$, $Li_{2.6}Cu_{0.4}N$, $Li_4Ti_5O_{12}$, and combinations thereof.

22. A method of making a lithium battery or lithium ion battery comprising: a. providing an electrolytic solution comprising a non-aqueous electrolytic solution according to claim 1 b. stacking atop one another 1. a first porous separator, 2. a cathode, 3. a second porous separator, and 4. an anode, c. wrapping the electrodes and separators of (b) tightly together using adhesive to form an assembly, d. inserting the assembly into an open-ended prismatic aluminum can or pouch, e. attaching respective current leads to respective anode and cathode, f. adding the electrolytic solution of (a) to the can or pouch, and g. sealing the can or pouch.

* * * * *